United States Patent Office 3,725,070
Patented Apr. 3, 1973

3,725,070
PHOTOGRAPHIC ELEMENT COMPRISING FILM FORMING POLYMERIC SUPPORT
Frederick L. Hamb and John C. Wilson, Rochester, N.Y., assignors to Eastman Kodak Company, Rochester, N.Y.
No Drawing. Filed May 7, 1971, Ser. No. 141,445
Int. Cl. G03c 1/78
U.S. Cl. 96—87 R    5 Claims

ABSTRACT OF THE DISCLOSURE

Novel high molecular weight polymers of 1,1'-spirobi[indan] diols or diamines, dicarboxylic acids of four or more carbon atoms and other diols which are useful in the preparation of photographic film bases.

FIELD OF THE INVENTION

This invention relates generally to film-forming polymeric compounds prepared by condensation reactions, and more particularly to film-forming, linear condensation polymers comprising units of a 1,1'-spirobi[indan] diol or diamine which polymers are useful as supports for photographic emulsions.

BACKGROUND OF THE INVENTION

There is a continuing demand for low cost film-forming materials with improved physical properties which materials can be used as supports for photographic elements. Currently available film-forming compositions that retain good physical characteristics at high temperatures (above 200° C.) have not found general acceptance because their manufacture involves expensive materials or difficult procedures.

It is known to prepare linear polyesters by the condensation of a dicarboxylic acid, or a chloroformic ester, with a 1,1'-spirobi[indan]-6,6'-diol. It is also known to make copolycarbonate esters containing units of 3,3,3',3'-tetramethyl - 1,1' - spirobi[indan]-6,6'-diol and 2,2-bis(p-hydroxyphenyl)propane (also known as bisphenol-A). (K. C. Stueben, "Polymers containing the 3,3,3',3'-Tetramethyl-1,1'-Spirobi-indane Residue," J. Polymer Sci., Part A, vol. 3, pp. 3209–3217 (1965)). Although all of these 1,1'-spirobi[indan]diol polymers display somewhat improved physical properties as evidenced by their glass transition temperatures ($T_g$), their brittleness precludes their use as flexible supports for photographic elements that are subject to high temperature processing. Thus an improved low-cost class of linear condensation polymers incorporating a 1,1'-spirobi[indan]nucleus and having good film-forming properties and high glass transition temperatures ($T_g$) is highly desirable.

SUMMARY OF THE INVENTION

Accordingly, it is an object of this invention to provide a new class of linear condensation polymers. Another object of this invention is to provide linear condensation polymers comprising units of a 1,1'-spirobi[indan]nucleus which have improved physical properties such as high glass transition temperatures and dimensional stability. It is a further object of this invention to provide film-forming linear polyesters comprising 1,1'-spirobi[indan]diol, bisphenol and dicarboxylic acid units useful as supports for photographic elements which are subjected to high temperature processing. Yet another object of this invention is to provide photographic elements having a new and improved support material.

These and other objects and advantages of this invention are obtained from a class of film-forming condensation polymers with improved physical properties such as high glass transition temperatures, preferably above 200° C., chemical and physical stability at high temperature and good flexibility and which can be prepared from low cost starting materials. As a consequence, these polymers have utility as photographic film bases, particularly in photographic films that are processed at high temperature such as heat developable film adapted for dry processing. The polymers of the present invention comprise units of (1) a dicarboxylic acid of four or more carbon atoms with units of (2) a 1,1'-spirobi[indan]diol or diamine and units of (3) an aliphatic or aromatic diol or of an alkylene bisphenol.

Linear condensation polymer films made according to this invention can be solvent cast, treated to improve the adhesion of subsequent coatings, and coated with photographic compositions. The resulting photographic elements can be processed at temperatures in excess of 200° C., and above 220° C. for certain embodiments, with little or no effect on dimensional stability of the element.

A preferred embodiment according to this invention relates to linear polyester materials comprising dicarboxylic units of four or more carbon atoms copolymerized with 1,1'-spirobi[indan]-6,6'-diol units and units of a dissimilar diol.

Another preferred embodiment of this invention relates to linear polyester materials comprising units of 1,1'-spirobi[indan]-6,6'-diol esterified with terephthalic acid units and additionally comprising in copolymerized relationship therewith units of one or more dissimilar diols.

A further preferred embodiment of this invention relates to linear polyester materials comprising terephthalic acid units esterified with diol units comprising 1,1'-spirobi[indan]-6,6'-diol units and bisphenol units.

Other useful polymers within the scope of this invention include linear polyester materials comprising units of a 1,1'-spirobi[indan]-6,6'-diol esterified with units of a dicarboxylic compound of four or more carbon atoms and in copolymerized relationship therewith units of one or more dissimilar diols with one or more dissimilar dicarboxylic compounds.

DETAILED DESCRIPTION OF PREFERRED EMBODIMENTS OF THIS INVENTION

The polymers of this invention include 1,1'-spirobi[indan]-6,6'-di-yl units and the polymers are represented by the Formula I:

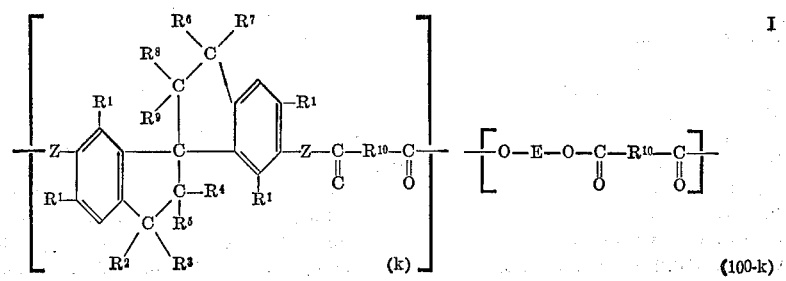

wherein Z is 0 or NH; each $R^1$, which can be the same or different, is a radical selected from the group consisting of a hydrogen atom or alkyl radicals of from 1 to 12 carbon atoms, such as methyl, ethyl, propyl, pentyl, hexyl, octyl, nonyl, undecyl and dodecyl, including branched chain alkyl radicals, such as tert-butyl, 2-ethylhexyl, 10-methylundecyl and the like; each of $R^2$, $R^3$, $R^4$, $R^5$, $R^6$, $R^7$, $R^8$, and $R^9$, which can be the same or different, are radicals selected from the group consisting of a hydrogen atom or alkyl radicals from 1 to 5 carbon atoms, with the proviso that $R^2$ and $R^6$ are the same and $R^3$ and $R^7$ are the same and that the sum of the carbon atoms in $R^2$ and $R^3$ equals the sum of the carbon atoms in $R^6$ and $R^7$ and equals the sum of the carbon atoms in $R^4$, $R^5$, $R^8$ and $R^9$ plus 2. $R^{10}$ is a radical selected from the group consisting of alkylene radicals of from 2 to 10 carbon atoms, such as ethylene, tetramethylene, pentamethylene, octamethylene, nonamethylene and the like; arylene radicals, such as o-, m-, or p-phenylene, naphthalenediyl, or anthracenediyl, unsubstituted or substituted with radicals such as hydrogen, halogen, nitro, cyano, alkyl of 1 to 6 carbon atoms or alkoxy of 1 to 6 carbon atoms; arylenebisalkylene radicals where the alkylene portion has 1 to 6 carbon atoms, such as phenylenedimethylene, phenylenediethylene, naphthalenediethylene and the like; cycloalkylene radicals, such as cyclopentylene, cyclohexylene, norbornanediyl; alkylenebisarylene radicals where the alkylene portion contains 1 to 12 carbons atoms, such as ethylene, trimethylene, hexamethylene, decamethylene, dodecamethylene, and the arylene portion is as defined above; alkylidenebisarylene radicals where the alkylidene portion contains 1 to 12 carbon atoms, such as ethylidene, allylidene, hexylidene and the like, and the arylene portion is as defined above; and arylenealkylene radicals where the arylene and alkylene portions are as defined above.

The radical $R^{10}$ may also be units having the Formula II:

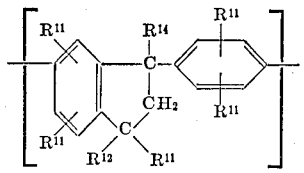

II wherein each $R^{11}$, which can be the same or different, is selected from the group consisting of hydrogen and aryl radicals such as phenyl, including substituted phenyl, halogen, cyano, nitro, and alkoxy and wherein the substituents on the phenyl radicals may be a halogen, cyano, nitro or alkoxy. Each $R^{12}$ and $R^{14}$ can be a hydrogen atom or an alkyl radical of 1 to 6 carbon atoms and each $R^{13}$ is an alkyl radical of 1 to 6 carbon atoms.

The radical E may be the same as $R^{10}$ as defined above or it may be represented by the Formula III:

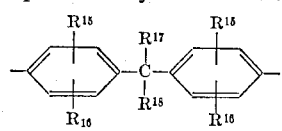

III wherein each $R^{15}$ and $R^{16}$, which can be the same or different, are selected from the group consisting of hydrogen atoms, aryl radicals, such as phenyl, including substituted phenyl, halogen atoms, nitro radicals, cyano radicals, alkoxy radicals and the like, and wherein the substituents on the phenyl radical may be a halogen atom, nitro radical, cyano radical, or alkoxy radical. $R^{17}$ and $R^{18}$ represent aliphatic, monocyclic or bicyclic radicals and can each be hydrogen atoms, alkyl radicals of from 1 to 6 carbon atoms, including substituted alkyl radicals, such as fluoromethyl, difluoromethyl, trifluoromethyl, dichlorofluoromethyl, 2-[2,3,4,5-tetrahydro-2,2-dimethyl-4-oxofur-3-yl]ethyl and the like; cycloalkyl radicals of from 4 to 6 carbon atoms, such as cyclohexyl; and aromatic radicals having from 6 to 20 carbon atoms, such as phenyl, 3,4-dichlorophenyl, 2,4-dichlorophenyl. $R^{17}$ and $R^{18}$ taken together with the carbon atom to which they are attached can represent a monocyclic, bicyclic, or heterocyclic moiety having from 4 to 7 atoms in the ring.

In the polymers of this invention and as set forth in Formula I, the spirobi[indan] portion comprises from about 2 to about 98 mole percent, thus, $k$ will be from about 2 to about 98, depending on the properties desired. In general, the higher the proportion of the spirobi[indan] portion, the higher the $T_g$.

A highly useful group of linear polymers of this invention which can be employed as flexible supports for photographic elements subjected to high temperature processing is represented by the Formula I, wherein $R^{10}$ is as defined previously and is preferably p-phenylene, $R^1$ is hydrogen or lower alkyl, preferably hydrogen, each of $R^2$, $R^3$, $R^6$, and $R^7$ is preferably methyl and each of $R^4$, $R^5$, $R^8$ and $R^9$ is preferably hydrogen, and E is the moiety depicted by Formula III.

The bifunctional 1,1'-spirobi[indan] monomers used to prepare the novel condensation polymers of this invention generally have the following Formula IV:

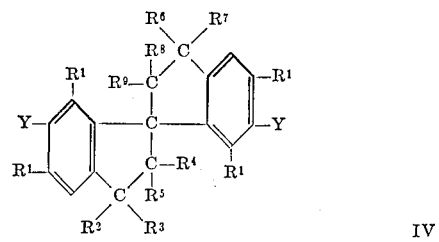

IV where Y is OH or $NH_2$ and $R^1$, $R^2$, $R^3$, $R^4$, $R^5$, $R^6$, $R^7$, $R^8$ and $R^9$ are as defined hereinabove.

A few of the bi-functional 1,1'-spirobi(indan) monomers to be used in the preparation of the polymers of this invention are known. The diol 3,3,3',3'-tetramethyl-1,1'-spirobi(indan)-6,6'-diol is obtained by heating of p,p'-isopropylidenediphenol (bisphenol-A) in an acid medium such as concentrated sulfuric acid at 140° C. See Howard, U.S. Pat. 3,271,463. When $R^2$, $R^3$, $R^6$ and $R^7$ in Formula IV are all methyl, Y is OH, and $R^1$, $R^4$, $R^5$, $R^8$ and $R^9$ are all hydrogen, then tetramethyl diols are shown in Ivo Wiesner, Czechoslovak Pat. No. 111,355 granted July 15, 1964. In addition, Stueben, K. D., referred to hereinbefore, shows the diol and diacetate of Formula IV where one $R^1$ on each phenyl ring is $CH_3$, while $R^2$, $R^3$, $R^6$ and $R^7$ are each $CH_3$ and $R^4$, $R^5$, $R^8$ and $R^9$ are hydrogen. Stueben also shows the diol of Formula IV wherein the $R^1$'s on each phenyl ring are hydrogen, while $R^2$–$R^9$ inclusive are as previously given. The tetramethyl diol of Stueben was prepared by the method of U.S. Pat. 2,979,535 and the hexamethyl diol and diacetate were prepared by the method of Baker & Besley, "Condensation Products of Phenols and Ketones," J. Chem. Soc., 1939, 1421–1424. R. F. Curtis, "vonBraun's 'Diphenylcyclobutane Derivative'," J. Chem. Soc., 1962, 415–418, shows the diol and diacetate compounds of Formula IV where the $R^1$'s in the 5 and 5' carbon positions are methyl and $R^2$, $R^3$, $R^6$ and $R^7$ are also methyl. The reaction products of the Stueben monomers with other materials including isophthaloyl chloride and adipyl chloride are also shown but these polymers have inferior thermal and physical properties for the objectives of this invention. Curtis, R. F., and Lewis, K. O., "Barne's 'Tetrahydroindenoindene' Derivatives," J. Chem. Soc., 1962, pages 418–421, shows spiro(indan)s where both Y's are unreacted $CH_3$, COOH, $NH_2$, H or OH, while $R^2$, $R^3$, $R^6$ and $R^7$ are $CH_3$ and $R^4$, $R^5$, $R^8$ and $R^9$ are H.

Many of the 1,1'-spirobi[indan] diol monomers to be used in preparing the linear polymers of this invention can be prepared from a substituted or unsubstituted gem-diphenylol alkane. The mechanism which is believed to take place when the gem-diphenylol alkane is bisphenol-A is illustrated below.

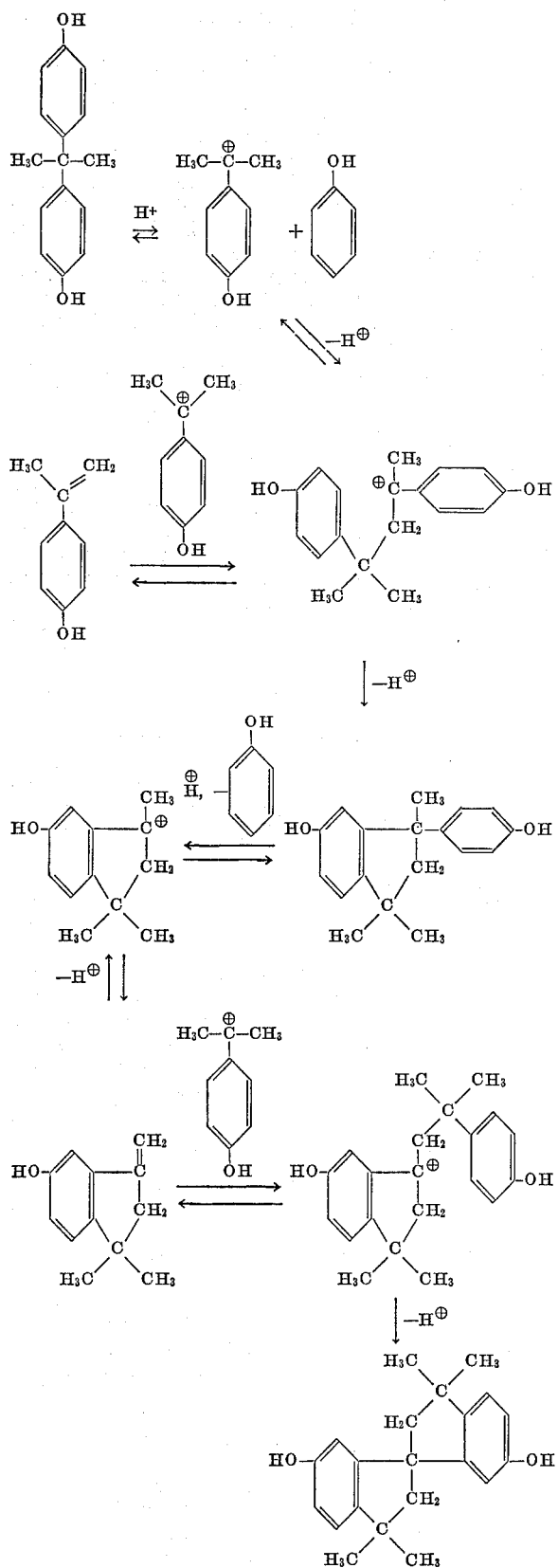

Typical useful bifunctional 1,1'-spirobi[indans] include the following which can be prepared by the methods described hereinbefore:

3,3,3',3'-tetramethyl-1,1'-spirobi[indan]-6,6'-diol
3,3'-diethyl-2,3,3',5,5',7,7'-heptamethyl-1,1'-spirobi[indan]-6,6'-diol
7,7'-dibutyl-3,3'-dimethyl-3,3'-dipropyl-2-ethyl-1,1'-spirobi[indan]-6,6'-diol
2,2'-dimethyl-7,7'-dioctyl-3,3,3',3'-tetraethyl-1,1'-spirobi[indan]-6,6'-diol
5,5'-bis(2-ethylhexyl)-6,6'-diamino-3,3'-dibutyl-3,3'-diethyl-2-propyl-2',7,7'-trimethyl-1,1'-spirobi[indan]
3,3'-di-isopropyl-2,2,3,3'-tetramethyl-5,5',7,7'-tetrapropyl-1,1'-spirobi[indan]-6,6'-diol
2,2'-diethyl-3,3'-di-sec.-butyl-2'-methyl-3,3',7,7'-tetrapropyl-1,1'-spirobi[indan]-6,6'-diol
7,7'-dibutyl-3,3'-di-isopropyl-3,3'-di-sec.-butyl-2-ethyl-2,2',2',5,5'-pentamethyl-1,1'-spirobi[indan]-6,6'-diol
3,3'-bis(1-ethylpropyl)-3,3'-bis(1-propylbutyl)-2,2-dipropyl-2',2'-diethyl-5,5',7,7'-tetramethyl-1,1'-spirobi[indan]-6,6'-diol The polymers according to this invention comprise units derived from bisphenols, monocyclic and polycyclic diols and alkylene glycols. The bisphenols employed in this invention are generally of the structure of Formula V:

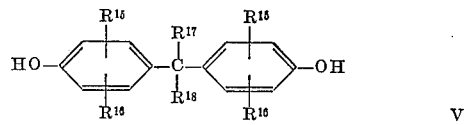

V where $R^{15}$, $R^{16}$, $R^{17}$ and $R^{18}$ are as defined hereinbefore.

Typical useful bisphenols include: Bisphenol A; 2,2-bis(4 - hydroxy-3,5-dichlorophenyl)propane[tetrachlorobisphenol A]; 1-phenyl-1,1-bis(4-hydroxyphenyl)ethane; 1 - (3,4-dichlorophenyl)-1,1-bis(4-hydroxyphenyl)ethane; 2,2 - bis(4 - hydroxyphenyl)-4-[3-(2,3,4,5-tetrahydro-2,2-dimethyl - 4 - oxofuryl)]butane; bis(4 - hydroxyphenyl) methane; 2,4 - dichlorophenylbis,4-hydroxyphenyl)methane; 1,1-bis(4-hydroxyphenyl)cyclohexane; 1,1,1,3,3,3-hexafluoro - 2,2-bis(4-hydroxyphenyl)propane; diphenylbis(4-hydroxyphenyl)methane.

Bisphenols of this type are economically attractive since they can generally be produced by the simple reaction mechanism as follows:

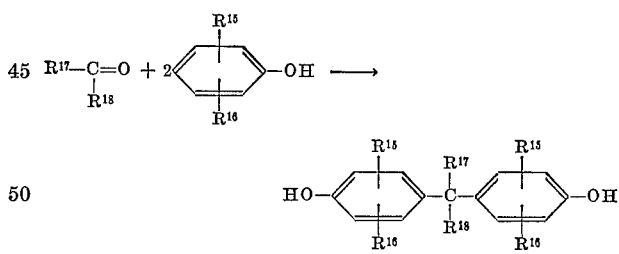

Other useful bisphenols include 1,4-naphthalene diol, 2,5-naphthalene diol, bis(4-hydroxy-2-methyl-3-propylphenyl)methane, 1,1 - bis(2-ethyl-4-hydroxy-5-sec.-butylphenyl)ethane, 2,2-bis(4-hydroxyphenyl)propane, 2,2-bis(4-hydroxy-2-methyl-5-tert.-butylphenyl)propane, 1,1-bis(4 - hydroxy-2-methyl-5-isooctylphenyl)isobutane, bis-(2 - ethyl - 4-hydroxyphenyl)-4,4-di-p-tolylmethane. Still other useful bisphenols are disclosed in U.S. Pat. 3,030,335 and Canadian Patent 576,491.

Typical monocyclic diols include hydroquinone and hydroquinones substituted with alkyl groups of 1 to 15 carbon atoms, or halogen atoms, resorcinol, unsubstituted or substituted with lower alkyl groups or halogen atoms, and the like, 1,4-cyclohexanediol, 1,4-cyclohexanedimethanol, 1,4-cyclohexanediethanol, 1,4-bis(2-hydroxyethoxy) cyclohexane, 1,4-benzenedimethanol, 1,4-benzenediethanol and the like.

Illustrative examples of polyalicyclic diols include norbornylene glycol, decahydro-2,6-naphthalenedimethanol and the compounds listed in Table I of U.S. Pat. 3,317,466 under the heading of "Bisphenols."

Exemplary alkylene glycols include ethylene glycol, diethylene glycol, triethylene glycol, 1,2-propanediol, 1,3- propanediol, 1,4-butanediol, 2,3-butanediol, 1,5-pentanedio,l, 1,6-hexanediol, 1,7-heptanediol, 1,8-octanediol, 1,9-nonanediol, 1,10-decanediol, 1,12-dodecanediol, neopentyl glycol, 2,2,4-trimethyl-1,6-hexanediol, and 4-oxa-2,6-haptanediol.

Dicarboxylic compounds which can be employed to advantage in the practice of this invention include succinic acid, glutaric acid, adipic acid, pimelic acid, azelaic acid, sebacic acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid (the above-described acids being useful either as the cis or trans form), phthalic acid, isophthalic acid, terephthalic acid, t-butylisophthalic acid, phenylenediacetic acid, phenylenedipropionic acid, 2,6-naphthalenedicarboxylic acid, 1,4-naphthalenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, 4,4'-stilbenedicarboxylic acid, and 9,10-triptycenedicarboxylic acid.

Although the dicarboxylic acids useful in the practice of this invention can be employed in the free acid form it is often more advantageous to utilize a bifunctional derivative. For example, the corresponding acid anhydrides may be used where they are available. Other useful bifunctional equivalents include the lower monohydric alcohol or phenyl esters of dicarboxylic acids and the dicarboxylic acid halides, e.g., the chlorides or bromides.

The molecular weight of the linear condensation polymers of this invention can vary over wide ranges, although we have found that polymers having a molecular weight of at least 30,000 are useful. Compounds having a molecular weight from about 80,000 to 100,000 are particularly desirable. The compounds of this invention are further characterized by their inherent viscosities. Generally, the subject film-forming polymers have an inherent viscosity of about 0.5 to about 1.2 and the polymers preferred as supports for photographic elements processed at high temperatures have an inherent viscosity of about 0.6 to about 0.8. The inherent viscosities are measured at 25° C. in chloroform at a concentration of 0.25 g. of polymer per 100 ml. of solution unless otherwise specified.

The glass transition temperatures of the polymers of this invention can be determined by differential thermal analysis as disclosed in "Techniques and Methods of Polymer Evaluation," vol. 1, Marcel Dekker, Inc., N.Y. 1966.

Film-forming as used in this invention refers to a material which will provide a self-supporting film of the material when cast or extruded, for example, when cast in sheets of from 1 to 7 mils thickness.

It is appreciated, of course, that the physical properties of the broad class of polymers of this invention, such as, for example, the glass transition temperature ($T_g$), yield strength, break strength, Young's modulus and the like, can be varied over a wide range. Polymers with properties in a particular range can be easily obtained by judicious selection of appropriate diol and dicarboxylic components and suitable mixtures thereof. The proper choice and proportions of the monomeric components can be determined by test procedures well-known to those skilled in the art of making condensation polymers. A useful class of polymers according to this invention with good thermal and mechanical properties comprises units of terephthalic acid esterified with diol units consisting of about 10 to about 100 mole percent, preferably about 10 to 60 mole percent, of 1,1'-spirobi[indan]-6,6'-diol units and about 98 to about 2 mole percent, preferably about 90 to 40 mole percent of bisphenol units.

As indicated in the general formulas set out hereinabove, the linear condensation polymers of this invention include polyesters, polyamides and mixed polyesterpolyamides, with polyesters being preferred. Generally any procedure known in the art for making linear condensation polymers can be used in preparing the polymers of this invention. The following are examples of processes that may be utilized to produce the linear polymers of this invention.

(a) The interfacial procedure can be utilized to make the polymers. A preferred embodiment with regard to the materials, solvents and catalysts is shown in Example 2. The preferred time of reaction is a function of all other variables and, as such, is governed by the viscosity desired for the polymer. Generally, the reaction can be monitored by sampling and thus the preferred polymerization time chosen. When methylene chloride is employed as the solvent in certain embodiments, the preferred temperature is 35° C., with a useful temperature range from about 10° C. to 40° C., such limits being governed on the one hand by maintaining a practical rate of reaction and on the other by the boiling point of the solvent. A variety of solvents may be employed to provide a broader range of temperatures and solubilities as desired. Other suitable solvents are chloroform, dichloroethane, propylene dichloride and the like.

(b) Polymers according to this invention can be prepared by a solution procedure whereby the 1,1'-spirobi[indan]diol and bisphenol reactants and the dicarboxylic acid halide, e.g., chloride or bromide, are placed in solution in the presence of an acid acceptor such as, for example, pyridine. The acid acceptor can also be present in excess and thus serve also as the solvent.

(c) The ester interchange procedure of synthesizing polymeric esters both by the melt process and the powder process can advantageously be used to make the polyesters of this invention, particularly for those copolymers which can be crystallized. In a preferred embodiment, these techniques may be used in combination with a solvent crystallization step to afford film-forming polyesters having improved physical properties including high softening temperatures and high molecular weights. The solvent crystallization procedure generally involves contacting melt process polymer with a solvent at ambient temperatures. Suitable solvents include acetone, 2-pentanone, ethyl acetate, acetic acid, toluene and the like. The treated material is separated from the solvent by any conventional procedure and put through the powder process. The melt process is advantageously conducted in the presence of a catalytic agent. Useful catalysts for the transesterification reactions include the carbonate, oxide, hydroxide, hydride and alkoxide of an alkali metal or an alkaline earth metal, a compound of a Group IV-A metal of the Periodic Table, e.g., titanium isopropoxide, organometallic halides and complex alkoxides such as $NaHTi(OC_4H_9)_2$ and the like.

The film-forming materials of this invention can be generally extruded or cast into flexible supports and used in various layer arrangements and structural combinations. Generally, the flexible supports of this invention are treated by any convenient method to improve the adhesion of superimposed coatings or layers. Useful procedures include subbing with conventional subbing agents for polyester supports, contacting with a chemical agent such as sulfuric acid, electron bombardment, and the like. The film-forming polyesters of this invention are used to advantage as flexible supports for photographic silver halide and other light-sensitive systems as well as for multi-layer elements used in color photography and diffusion transfer processes. In a preferred embodiment, a support of the polyester of this invention is used as the film support in photographic elements which are heat-processed or heat-stabilized. In particular, one preferred embodiment relates to photographic elements comprising the supports of this invention having at least one layer of a photographic emulsion which contains silver halide grains having polyvalent ions included therein as disclosed in Bacon et al. U.S. 3,447,927. Elements of this type can be processed according to Colt, U.S. Patent 3,418,122 issued Dec. 24, 1968.

The following examples illustrate the preparation of the polymers of this invention:

Example 1.—Polymerization of 3,3,3',3'-tetramethyl-1,1'-spirobi[indan] - 6,6' - diol,2,2 - bis(p-hydroxyphenyl)-propane and terephthaloyl chloride (interfacial process)

A mixture of 3.08 g. (0.01 mole) of 3,3,3',3'-tetramethyl-1,1'-spirobi[indan]-6,6'-diol, 2.28 g. (0.01 mole) of 2,2-bis-(p-hydroxyphenyl)propane, 80 ml. (0.04 mole) of 0.5 N NaOH, 70 ml. of distilled water and 3 drops of tri-n-butylamine is stirred in a blender. To the mixture is added a solution of 4.06 g. (0.02 mole) of terephthaloyl chloride in 50 ml. of methylene chloride. The mixture is then stirred for 1⅓ hrs. Methylene chloride lost by vaporization is replaced during the polymerization and 10 ml. of additional 0.5 N NaOH is added to maintain a basic system. The mixture is then acidified with 5 ml. of glacial acetic acid and precipitated in 1 liter of methanol. The polymer is washed well with methanol and dried in a vacuum oven at 100° C. Inh. Visc. is 0.56, $T_g$ is 276° C.

As indicated hereinabove, a useful class of polyesters according to this invention comprises units of a 1,1'-spirobi[indan]diol esterified with a dicarboxylic compound and additionally comprising in copolymerized relationship therewith units of a dissimilar diol. Generally, desirable increases in the glass transition temperature of members of this class of copolyesters are achieved by reducing the mole percent of the dissimilar diol employed in the polymerization. This effect is illustrated by Example 2 below.

Example 2

Other copolymers employing the components of Example 1, in different ratios, are prepared according to the procedure of that example. The structure of the repetitive units and the properties of the resulting copolymers are shown in Table I below:

TABLE I

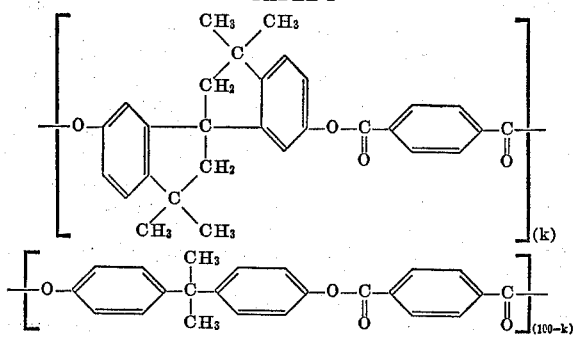

| Mole percent in feed (k) | Inherent viscosity [1] | $T_g$ (° C.) |
|---|---|---|
| 10 | 0.66 | 222 |
| 20 | 0.67 | 255 |
| 30 | 0.43 | 254 |
| 40 | 0.39 | 262 |
| 50 | 0.56 | 276 |
| 60 | 0.47 | 280 |
| 75 | 0.18 | 266 |
| 85 | 0.46 | 295 |
| 95 | 0.21 | 291 |
| 100 | 0.24 | 295 |

[1] Measured in 1:1-phenol: chlorobenzene (0.25 g. of polymer/100 ml. of solvent at 25° C.).

Example 3.—Polymerization of 3,3,3',3'-tetramethyl-1,1'-spirobi[indan]-6,6'-diacetate, 2,2-bis(p-acetoxyphenyl) propane, and terephthalic acid (melt process)

In a 50 ml. polymer flask equipped with a Vigreux-Claisen adapter and nitrogen inlet tube is placed 9.80 g. (0.025 mole) of 3,3,3',3'-tetramethyl-1,1'-spirobi[indan]-6,6'-diacetate, 7.80 g. (0.025 mole) of 2,2'-bis(p-acetoxyphenyl)propane, 8.30 g. (0.05 mole) of terephthalic acid and a small amount of dibutyl tin oxide catalyst. The mixture is heated at 270° C. to 320° C. for 2½ hours under a nitrogen atmosphere, allowing the acetic acid condensate to escape from the system. At this time, the Vigreux-Claisen adapter and nitrogen inlet tube are removed and a stirrer and vacuum line are connected to the flask. With stirring, the flask is put under vacuum for 10 minutes at 325° C. when the polymer can no longer be stirred. The flask is then disconnected from the vacuum and cooled. Inh. visc. is 0.29.

Example 4

The inserent viscosity of the polymer prepared in Example 3 is increased by the technique of solid phase buildup. The polymer prepared in Example 3 is ground to a fine powder and heated in a 50 ml. polymer flask under a 0.10 mm. vacuum for 111 hours. During this period, the temperature of the system is increased from 230° C. to 269° C. The powder is then isolated. The inh. viscosity is 0.92 in 1:1-phenol:chlorobenzene, (0.25 g./100 ml.).

Example 5

The disodium salt monohydrate of 3,3,3',3'-tetramethyl-1,1'-spirobi[indan]-6,6'-diol can be prepared by any convenient method. In a typical procedure, a mixture of 100 parts of 3,3,3',3'-tetramethyl-1,1'-spirobi[indan]-6,6'-diol and 52 parts of sodium hydroxide is refluxed for about 5 hours in about 1800 parts of a 1:1 mixture of ethanol and water. The suspension is cooled to about 20° C. and the solid is collected on a filter, washed well with fresh water and dried. The dried material is recrystallized from a 1:1 mixture of ethanol and water and dried at 110° C. under vacuum.

Example 6.—Polymerization of 3,3,3',3'-tetramethyl-1,1'-spirobi[indan]-6,6'-diol, 2,2,-bis(p-hydroxyphenyl)propane, and isophtholyl chloride (interfacial process)

In a blender is placed 3.70 g. (0.01 mole) of 3,3,3',3'-tetramethyl-1,1'-spirobi[indan]-6,6'-diol disodium salt monohydrate prepared as by Example 5, 2.28 g. (0.01 mole) of 2,2-bis(p-hydroxyphenyl)propane, 40 ml. (0.02 mole of 0.5 N NaOH, 110 ml. of distilled water, and 3 drops of tri-n-butylamine. To this stirred mixture is added a solution of 4.06 g. (0.02 mole) of isophthaloyl chloride in 50 ml. of methylene chloride. Stirring is contained for 3½ hours. Due to evaporation, additional methylene chloride is added and 10 ml. additional 0.5 N NaOH is added to keep the mixture basic. The mixture is acidified with 3 ml. of glacial acetic acid and then poured into 1 liter of methanol. The precipitated polymer is washed again with methanol and dried in a vacuum oven at 100° C. Inh. Visc. is 0.31, $T_g$ is 218° C.

Example 7.—Polymerization of 3,3,3',3'-tetramethyl-1,1'-spirobi[indan]-6,6'-diol, 2,2-bis(p-hydroxyphenyl)propane and phthaloyl chloride (interfacial process)

This polymer is prepared in the manner of Example 6 using 3.70 g. (0.01 mole) of 3.3,3'3'-tetramethyl-1,1'-spirobi[indan]-6,6'-diol disodium salt monohydrate, 2.28 g. (0.01 mole) of 2,2-bis(p-hydroxyphenyl)propane, 40 ml. (0.02 mole) of 0.5 N NaOH, 110 ml. of distilled water, 4.06 g. (0.02 mole) of phthaloyl chloride, 50 ml. of methylene chloride, and 3 drops of tri-n-butylamine.

The mixture is stirred for 3½ hours followed by acidification with 5 ml. of glacial acetic acid. The polymer is precipitated in 1 liter of methanol, washed again with methanol and dried in a vacuum oven at 100° C. Inh. Visc. is 0.12, $T_g$ is 170° C.

Example 8.—Polymerization of 3,3,3',3'-tetramethyl-1,1'-spirobi[indan]-6,6'-diol, 2,2-bis(p-hydroxyphenyl)propane and adipyl chloride (Interfacial process)

The method of Example 6 is used to prepare this polymer with 3.70 g. (0.01 mole) of 3,3,3',3'-tetramethyl-1,1'-spirobi[indan]-6,6'-diol disodium salt monohydrate, 2.28 g. (0.01 mole) of 2,2-bis(p-hydroxyphenyl)propane, 40 ml. (0.02 mole) of 0.5 N NaOH, 110 ml. of distilled water, 3.66 g. (0.02 mole) of adipyl chloride, 50 ml. of methylene chloride, and 3 drops of tri-n-butylamine. The polymerization is run for 3½ hours. Additional methylene chloride and 20 ml. of 0.5 N NaOH are added during this time. The mixture is acidified with 5 ml. of glacial acetic acid and poured into 1 liter of methanol, washed again with methanol and dried in a vacuum oven at 50° C. Inh. Visc. is 0.09, $T_g$ is 72° C.

Example 9.—Polymerization of 3,3,3′,3′-tetramethyl-1,1′-spirobi[indan]-6,6′ - diol, hydroquinone, and terephthaloyl chloride (interfacial process)

This polymer is prepared according to the method of Example 6 with 3.70 g. (0.01 mole) of 3,3,3′,3′-tetramethyl-1,1′-spirobi[indan]-6,6′-diol disodium salt monohydrate, 1.10 g. (0.01 mole) of hydroquinone, 40 ml. (0.02 mole) of 0.5 N NaOH, 110 ml. of distilled water, 4.06 g. (0.02 mole) of terephthaloyl chloride, 50 ml. of methylene chloride, and 3 drops tri-n-butylamine. After 3½ hours of reaction time, during which additional methylene chloride and 10 ml. of 0.5 N NaOH are added, the mixture is acidified with 5 ml. of glacial acetic acid and poured into 1 liter of methanol. The polymer is washed again with methanol and dried in a vacuum oven at 100° C. Inh. Visc. is 0.02, $T_g$ is 137° C.

Example 10.—Polymerization of 3,3,3′,3′-tetramethyl-1,1′-spirobi[indan]-6,6′-diol, tetrachlorobisphenol A and chloride (interfacial process)

The method of Example 1 is used to make this polymer. The Inh. Visc. is 0.38 and the $T_g$ is 272° C.

Example 11.—Polymerization of 3,3,3′,3′-tetramethyl-1,1′-spirobi[indan]-6,6′-diol, 2,2 - bis(p-hydroxyphenyl)norbornane and terephthaloyl chloride (interfacial process)

This polymer, prepared in the manner of Example 1, has an Inh. Visc. of 0.21 and a $T_g$ of 274° C.

Example 12

As indicated previously, useful copolyesters of this invention can be prepared by the copolymerization of several dissimilar diols with several dissimilar dicarboxy compounds. In a typical illustrative example, 3,3,3′,3′-tetramethyl-1,1′-spirobi[indan]-6,6′-diol (I) and bisphenol A (II) are corecated with terephthalic acid (III) and isophthalic acid (IV) in various proportions according to the procedure of Example 1. The moles of each reactant and the inherent viscosities are shown in Table II.

TABLE II

| Run | Compound (moles) | | | | Inherent viscosity of polymer |
|---|---|---|---|---|---|
| | I | II | III | IV | |
| (a) | 1 | 1 | 1 | 1 | 0.47 |
| (b) | 1 | 1 | 0.75 | 0.25 | 0.51 |
| (c) | 1 | 1 | 0.25 | 0.75 | 0.38 |

Example 13.—Polymerization of 3,3,5,3′,3′,5′-hexamethyl-1,1′-spirobi[indan]-6,6′-diacetate, 2,2-bis(p-acetoxyphenyl)propane and terephthalic acid (malt process)

This polymer is prepared in the manner of Example 3 using 0.006 mole of 3,3,5,3′,3′,5′ - hexamethyl - 1,1′-spirobi[indan]-6,6′-diol, prepared in the manner of W. Baker and D. M. Besly, J. Chem. Soc., 1939, page 1421, 0.020 mole of terephthalic acid and 0.014 mole of 2,2-bis(p-acetoxyphenyl) propane. The Inh. Visc. is 0.36 and the $T_g$ is 259° C.

Example 14

A polymer of terephthalic acid and 3,3,5,3′,3′,5′-hexamethyl-1,1′-spirobi[indan]-6,6′-diacetate is made according to the procedure of Example 3. The Inh. Visc. is 0.20 and the $T_g$ is 291° C.

As indicated previously, the glass transition temperatures of 1,1′-spirobi[indan]copolyesters such as the polymers prepared in Examples 7, 8 and 9 can be advantageously increased by suitable reductions in the mole percent of dissimilar diol employed in the polymerization.

It has been pointed out hereinabove that the polymers of this invention can be employed to advantage in the preparation of flexible films. Certain of these films, prepared from polyesters of this invention which have glass transition temperatures above about 200° C., and preferably above about 220° C., are especially useful as flexible supports for photographic elements which are processed at high temperatures. Film formation by solvent casting and the preparation of a photographic product for high temperature processing are illustrated by Examples 15 and 16 respectively.

Example 15

A 10 percent solution of a polymer, prepared by the procedure of Example 1 (double size run) and having an inherent viscosity of 0.40 is made up as follows:

10 g. of polymer
81 ml. of 1,2-dichloroethane, and
9 ml. of 3A-ethanol

The mixture is shaken until complete solution is achieved and filtered through a fritted glass funnel with diatomaceous earth. The clear filtrate is then coated on Teflon-covered glass plates. The coatings are air dried at room temperature for 24 hours and further dried in an oven at 100° C. for 4 hours giving a clear amorphous film with a thickness of 4 to 6 mils, having the physical properties shown in Table III below.

TABLE III

| | |
|---|---|
| Yield strength, p.s.i. | 7,730 |
| Yield elongation | 4.75 |
| Break strength, p.s.i. | 7,730 |
| Break elongation, percent | 4.75 |
| Young's modulus, p.s.i. | $2.59 \times 10^5$ |

Example 16

Strips of film prepared in Example 15 are treated according to the procedure of Lidel, U.S. Ser. No. 80,482, filed Oct. 13, 1970 and Belgian Pat. 736,993 to promote adhesion of the photographic emulsion that is applied in the next step. Each of the treated strips is coated with a light-sensitive printout emulsion. Each emulsion coating has a thickness of 4 mils. The coated films are heated on a mandrel for 5-second intervals and tested manually to detect heat distortion. The heat distortion temperature is the temperature at which the coated film begins to stretch under the application of manual pressure at each end of the strip. The data obtained in this example is shown in Table IV.

TABLE IV

| Temperature (0 C.): | Distortion |
|---|---|
| 230 | None. |
| 250 | None. |
| 260 | None. |
| 265 | Yes. |
| 275 | Yes. |

The adhesion of the photosensitive layer both before and after exposure and processing is satisfactory.

As previously indicated, polymers of this invention which have glass transition temperatures above about 200° C. and are useful as supports for photographic elements processed at high temperatures, can be prepared by employing a combination of techniques well-known in the art. Typically, the melt and powder processes can be combined to advantage with an intervening crystallization step as illustrated in Examples 17 and 18.

Example 17.—Polymerization of 3,3,3′,3′-tetramethyl-1,1′-spirobi[indan] - 6,6′ - diacetate, 2,2-bis(p-acetoxyphenyl)propane, and terephthalic acid (melt process)

In a 200 ml. polymer flask equipped with a Vigreux-Claisen adapter and nitrogen inlet tube is placed 29.40 g. (0.075 mole) of 3,3,3′,3′-tetramethyl-1,1′-spirobi[indan]-6,6′-diacetate, 54.6 g. (0.175 mole) of 2,2-bis(p-acetoxyphenyl)propane, 41.5 g. (0.250 mole) of terephthalic acid and a small amount of dibutyltin oxide catalyst. The mixture is heated at 270° C. to 320° C. for 2.42 hours under a nitrogen atmosphere, removing the acetic acid distillate as formed. The flask is then cooled and the polymer is isolated. The Inh. Visc. (1:1-phenol:chlorobenzene, 0.25 g. of polymer per 100 ml. of solution) is 0.18. $T_g$ is 168° C.

Example 18.—Polymerization of 3,3,3',3'-tetramethyl-1,1'-spirobi[indan]-6,6'-diacetate, 2,2 - bis(p-acetoxy-phenyl)propane, and terephthalic acid (powder build-up)

The polymer prepared in Example 17 is ground to a powder and is allowed to stand in a large volume of acetone at 25° C. for 24 hours. The crystalline polymer is then collected by filtration and dried in a 60 to 80° C. vacuum oven with a pressure of approximately 20 to 30 millimeters.

The polymer crystallized by this procedure is placed in a 200 ml. polymer flask and heated with an applied vacuum of 1.0 millimeter. Over a 17.50 hour time period, the temperature of the flask contents is raised from 200° C. to 274° C. The polymer is then cooled and isolated. Inh. Visc. is 0.65, $T_g$ is 264° C.

It is understood, of course, that the glass transition temperatures ($T_g$) of the polymers prepared according to the procedures set out in Examples 11–13 above can be varied as desired by suitable adjustments in the mole ratios of the diol components as employed in Example 17. Generally, the $T_g$ is raised by increasing the mole percent of spirobi[indan]diol. We have also found that the melt polymerization reaction carried out in Example 17 can be effectively conducted at lower temperatures in the range from about 260° C. to about 268° C., provided that the reaction time and period of agitation are correspondingly increased from about 3 to about 20 hours, preferably from about 12 to about 18 hours.

Example 19

Films are fabricated by solvent casting the polymers prepared according to Example 18 in which the mole percent of 3,3,3',3' - tetramethyl-1,1'-spirobi[indan]-6,6'-diacetate is varied in 10 percent increments from 20 to 50 mole percent.

A 10 g. sample of each polymer is dissolved in chloroform, filtered, and concentrated to approximately 50 percent concentration. Each concentrate is cast to a film in the usual manner, partially dried and cured at 80° C. Film strips one inch by eight inches are cut from each cured film. The film strips are examined with an Instron Universal Testing Apparatus, floor model (TT) with a crosshead speed of two inches per minute. The values obtained for the various tensile properties are shown in Table V below.

TABLE V

| Polyester [1] composition | Inherent viscosity | Film thickness (mils) | Young's modulus ($\times 10^{-5}$ p.s.i.) | 2% offset yield strength ($\times 10^{-3}$ p.s.i.) | Break strength ($\times 10^{-3}$ p.s.i.) | 2% offset yield elongation (percent) | Break elongation (percent) |
|---|---|---|---|---|---|---|---|
| 20 | 0.66 | 5.0 | 2.50 | 7.00 | 8.20 | 4.75 | 25.25 |
| 30 | 0.65 | 8.0 | 2.88 | 6.05 | 7.00 | 4.10 | 13.25 |
| 40 | 0.71 | 5.5 | 3.00 | 6.36 | 7.36 | 4.25 | 29.00 |
| 50 | 0.64 | 6.0 | 2.75 | 6.33 | 7.16 | 4.25 | 12.77 |

[1] Mole percent 3,3,3',3'-tetramethyl-1,1'-spirobi[indan]-6,6'-diacetate.

Example 20

Heat distortion data are obtained with an Instron Testing Instrument for a chloroform cast film (5.5 mils thickness) prepared from a polymer made according to the procedures of Examples 17 and 18, and using 30 mole percent of 3,3,3',3'-tetramethyl-1,1'-spirobi[indan]-6,6'-diol. A two percent extension was observed at 262° C., corrected, with a load of 50 p.s.i. and a heating rate of 2° C. per minute.

6,6'- diamino-1,1'-spirobi[indan] derivatives may be employed to advantage in making linear condensation polymers of this invention. 6,6' - diamino - 1,1' - spirobi[indans] can be made according to the procedure of R. F. Curtis and K. O. Lewis, J. Chem. Soc., 1962, page 420, which involves treatment of a 6,6'-dicarboxy-1,1'-spirobi[indan] with sodium azide in the presence of strong mineral acid. The intermediate 6,6'-dicarboxy compound is prepared from the corresponding 6,6'-dimethyl-1,1'-spirobi[indan] by chromic acid oxidation.

Generally, the film-forming materials of this invention can be solvent-cast or melt-extruded into sheets or films as useful flexible supports which can be utilized in various larger arrangements and structural combinations. Generally the flexible supports of this invention are treated by any convenient method to improve the adhesion of superimposed coatings or layers. Useful procedures include sub-coating with either aqueous subbing systems, such as latexes or with organic subbing systems comprising solvent-soluble polymers in aqueous or organic solvents or in solvent mixtures, contacting with a chemical agent, such as sulfuric acid, electron bombardment and the like.

Films prepared from the linear condensation polymers of this invention are highly useful as flexible supports for photographic silver halide emulsions and other light-sensitive systems that do not contain silver halides which must be processed at elevated temperatures. Similarly, films prepared from the polymers of this invention can be employed as flexible supports for light-sensitive photographic elements that are processed solely by the application of heat. Polymeric films according to this invention are also desirable as supports for multilayer elements used in color photography and in diffusion transfer processes.

Film supports prepared from polymers of this invention are compatible with a wide variety of materials employed as binding agents in photographic silver halide emulsions. Useful binding agents include gelatin, synthetic polymeric compounds, such as dispersed vinyl compounds, such as in latex form and mixtures of gelatin and other synthetic polymeric compounds. The polymers of this invention find further use as supports for light-sensitive colloid layers such as are used in image transfer processes, in lithography, and the like. The high temperature characteristics and dimensional stability of the subject polymers make them suitable as supports for photoresists such as those utilized in the preparation of printed circuits, and the like.

Polymeric compositions according to this invention are advanageously prepared by standard techniques using well-known industrial processes. The compounds employed in making the polymers of this invention are prepared from readily available, inexpensive materials. A further advantage of the polymers of this invention is that they may be readily formed into film using procedures consistent with commercially available equipment.

The invention has been described in detail with particular reference to preferred embodiments thereof, but it will be understood that variations and modifications can be effected within the spirit and scope of the invention.

We claim:

1. A photographic element comprising a photographic emulsion coated on a film of a linear polymer comprising units of a 1,1'-spirobi(indan)diol or diamine, a dicarboxylic acid of at least four carbon atoms and a diol selected from the group consisting of aliphatic diols, aromatic diols and bisphenols.

2. The photographic element of claim 1 wherein the spirobi(indan) component is 3,3,3',3'-tetramethyl-1,1'-spirobi(indan)6,6'-diol, the acid is terephthalic acid and the diol is bisphenol A.

3. A photographic element comprising a photographic emulsion coated on a film of a linear polymer comprising units having the formula:

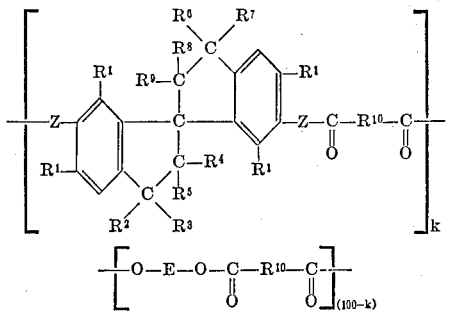

wherein $k$ is an integer of about 2 to about 98; Z is O or NH; each $R^1$ is a radical selected from the group consisting of a hydrogen atom or alkyl radicals of from 1 to 12 carbon atoms; $R^2$, $R^3$, $R^4$, $R^5$, $R^6$, $R^7$, $R^8$ and $R^9$ are radicals selected from the group consisting of a hydrogen atom or alkyl radicals of from 1 to 5 carbon atoms; $R^2$ and $R^6$ being the same radicals; $R^3$ and $R^7$ being the same radical; the sum of the carbon atoms in $R^2$ and $R^3$ equals the sum of the carbon atoms in $R^6$ and $R^7$; the sum of the carbon atoms in $R^2$ and $R^3$ equals the sum plus two of the carbon atoms in $R^4$, $R^5$, $R^8$ and $R^9$; and $R^{10}$ and E are radicals selected from the group consisting of alkylene radicals of from 2 to 10 carbon atoms, arylene radicals, arylenebisalkylene radicals having 1 to 6 carbon atoms in the alkylene portion, cycloalkylene radicals, alkylenebisarylene radicals having 1 to 12 carbon atoms in the alkylene portion, alkylidenebisarylene radicals having 1 to 12 carbon atoms in the alkylidene portion, and arylenealkylene radicals having 1 to 12 carbon atoms in the alkylene portion.

4. The photographic element of claim 3 wherein $R^{10}$ is a radical having the formula:

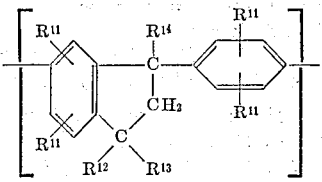

wherein the $R^{11}$'s are radicals selected from the group consisting of hydrogen, aryl radicals, halogen, cyano, nitro, alkoxy radicals and substituted phenyl, wherein the substituents can be halogen, cyano, nitro and alkoxy; $R^{12}$ and $R^{14}$ are radicals selected from the group consisting of hydrogen and alkyl radicals of 1 to 6 carbon atoms and $R^{13}$ is an alkyl radical of 1 to 6 carbon atoms.

5. The photographic element of claim 3 wherein E is a radical having the formula:

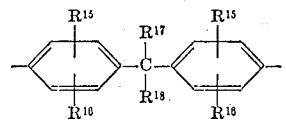

wherein $R^{15}$ and $R^{16}$ are radicals selected from the group consisting of hydrogen, aryl radicals, halogen, cyano, nitro, alkoxy radicals, and substituted phenyl, wherein the substituents can be halogen, cyano, nitro and alkoxy and $R^{17}$ and $R^{18}$ are radicals selected from the group consisting of hydrogen, alkyl radicals of from 1 to 6 carbon atoms, cycloalkyl radicals and aromatic radicals of from 6 to 20 carbon atoms.

References Cited
UNITED STATES PATENTS

| | | | |
|---|---|---|---|
| 3,634,089 | 1/1972 | Hamb et al. | 96—87 R |
| 3,386,935 | 6/1968 | Jackson et al. | 96—87 R |
| 2,945,008 | 7/1960 | Caldwell et al. | 96—87 R |

RONALD H. SMITH, Primary Examiner

U.S. Cl. X.R.

260—47 C, 47 CZ